ary Examiner—Evon C. Blunk
United States Patent [19]
Fauth

[11] 3,927,757
[45] Dec. 23, 1975

[54] AUTOMATIC CONTROL SYSTEM FOR A MOTOR-DRIVEN CONVEYOR SECTION

[75] Inventor: Frederick E. Fauth, Baltimore, Md.

[73] Assignee: American Bottlers Equipment Company, Baltimore, Md.

[22] Filed: Oct. 7, 1974

[21] Appl. No.: 512,609

[52] U.S. Cl. .................. 198/37; 198/76; 198/110
[51] Int. Cl.² ......................................... B65G 43/08
[58] Field of Search .................. 198/37, 76, 110, 34

[56] References Cited
UNITED STATES PATENTS

| | | | |
|---|---|---|---|
| 2,936,060 | 5/1960 | Carter | 198/37 X |
| 3,145,825 | 8/1964 | Carter | 198/37 X |
| 3,465,869 | 9/1969 | Benatar | 198/110 |

Primary Examiner—Evon C. Blunk
Assistant Examiner—Douglas D. Watts
Attorney, Agent, or Firm—Cantor & Kraft

[57] ABSTRACT

An automatic control system for a motor-driven conveyor section is disclosed, the control system being operable upon each section of a multi-section article conveyor to avoid and clear an undesired accumulation of articles thereon as might be caused by a downstream blockage. A speed control mechanism responsive to a sensed accumulation of articles at a downstream end of the conveyor section serves to automatically modulate the velocity of the conveyor section within a first range of speeds to thus effect a reduction of speed of the conveyor section, from a nominal "high" or running speed towards a nominal "low" speed thereby reducing article feed. If the accumulation is not thereby cleared, but grows and is subsequently sensed at the upstream end of the conveyor section, a limit shift means is operated which automatically shifts the speed modulation range downwardly such as from the nominal "low" speed towards a zero speed or stop. Once the accumulation of articles begins to clear such that no accumulation is sensed at the downstream end of the conveyor section, the conveyor speed is modulated upwardly from zero towards the nominal "low" speed and, when the accumulation of articles at the upstream end of the conveyor section finally clears, the conveyor speed is increased still further towards the normal running or nominal "high" speed condition.

8 Claims, 4 Drawing Figures

AUTOMATIC CONTROL SYSTEM FOR A MOTOR-DRIVEN CONVEYOR SECTION

BACKGROUND OF THE INVENTION

This invention generally relates to conveying apparatus and is particularly concerned with the provision of an automatic control system for a motor-driven conveyor section, the control system operating to avoid and clear undesired accumulations of articles thereon as might be caused by a downstream blockage.

Conventional conveyor control techniques as particularly applied to a conveyor constituting a plurality of individually driven sections dictate that some mechanism be provided for slowing down or shutting off each conveyor section as articles begin to undesirably accumulate thereon such as would occur if a downstream blockage existed, for example. Although this control function has been accomplished in numerous different ways in the prior-art, all generally have in common the provision of a mechanism which can serve to shut down the conveyor motor drive in response to a control signal generated by an article accumulation sensor disposed somewhere at the conveyor section. Typically, however, the usual automatic starting and stopping control mechanisms for the conveyor motor drive constitute threshold devices which quickly and in a stepwise manner either turn on or off the conveyor drive, resulting in jerky and rapid starts and stops which are not conducive to the stability of packages or other articles on the conveyor so driven. Further, such typical prior-art controls are quite inefficient in that poor or no provisions are made for initially modulating the conveyor speed before shut-off in an effort to clear the accumulation, and a shut-off of the motor drive is usually effected before the controlled conveyor section is fully filled with accumulated articles.

Previous attempts to avoid these known drawbacks of the most typical conveyor control mechanisms involved complex and expensive apparatus and required specialized training of the conveyor operator. As such, these complicated attempts at improving the basic control technique above-discussed have met with little commercial success.

SUMMARY OF THE INVENTION

It is therefore apparent that a need still exists in the conveyor control art for the provision of a control system which will function to overcome the known disadvantages above-discussed, but which system still remains uncomplicated to make, use, and install, and which system functions in an entirely automatic manner requiring no intervention from an operator. It is the primary objective of the instant invention to provide such a new and improved conveyor control system.

A further more specific objective of the instant invention is to provide a conveyor control system which functions to gradually and smoothly slow down and/or stop the conveyor section upon sensing an accumulation of articles thereon, and, conversely, to gradually and smoothly accelerate the conveyor section back to normal or running speed when the accumulation clears, thus eliminating the jerky stop and start motion inherent in the usual prior-art apparatus.

A further objective of the instant invention is to provide a control system for a conveyor apparatus which operates so as to effect acceleration and deceleration of the conveyor at different rates as desired or required.

Still another objective of the instant invention is the provision of an automatic control system for a conveyor section which will serve to allow packages and other articles to accumulate on the conveyor section when downstream elements are not demanding a supply, and which will fully utilize the storage capacity of the conveying system section, thus increasing the efficiency of the overall conveying apparatus.

Still another objective of the instant invention is to provide an automatic control system which not only starts and stops a conveying section depending upon the accumulation of articles thereon, but which serves to fully modulate the speed of the conveying section thus compensating for article demand.

It is still another objective of the instant invention to provide a conveyor control system which operates not only to slow down and/or stop a conveying section upon detection of an undesired accumulation, but also can serve to speed-up the conveying section and thus the packaging process to accommodate increased demands of the downstream apparatus.

Yet another important objective of the instant invention is to provide such an automatic control having specific utility with a fluid or hydraulic conveyor motor-drive, such control in and of itself being fluidic in nature, thus eliminating operational maintenance and increasing the reliability and length of service of the control apparatus.

SUMMARY OF THE INVENTION

These objectives as well as others which will become apparent as the description proceeds are implemented by the conveyor control system of the invention which, as aforestated, will be seen to have particular utility in conjunction with a fluid or hydraulic conveyor motor drive. A speed control means for the conveyor motor drive is provided which serves to automatically modulate the velocity of the article conveyor within a range of speeds defined by predetermined upper and lower limits. For example, the range of speeds could initially fall within a normal running or "high" speed and a nominal "low" speed. Operation of the speed control means is effected by the presence of a first control signal which is generated by a sensing apparatus disposed in a downstream location with respect to the direction of conveyance and which serves to detect an accumulation of articles at such location. Thus, upon the detection of an accumulation of articles at the downstream end of a conveying section, the speed control means is contemplated to be actuated to reduce the speed of the conveyor motor drive from a "high" speed towards a "low" speed in an automatic fashion, thus reducing the rate of article feed. In the preferred inventive embodiment, such speed control means will be seen to constitute a hydraulic cylinder arrangement actuated by a fluidic sensor and serving to modulate the speed of the conveyor motor drive in a smooth and continuous fashion.

Under some circumstances, this modulation of conveyor speed from "high" speed towards a "low" speed is enough in and of itself to clear an accumulation of articles sensed at the downstream end of the conveyor section. If this is the case, the speed control means of the instant invention then serves to remodulate the conveyor speed upwardly back towards the normal or "high" running speed, again in a smooth and continuous fashion through the utilization of fluid techniques. However, in the event that the accumulation of articles on the conveyor section continues to build up until such accumulation reaches the upstream end of the conveying section, further corrective measures are necessary and are taken by the novel system of the instant invention.

Specifically, the control system of the instant invention will automatically adjust the predetermined upper and lower limits of the speed control mechanism above-discussed so as to shift the speed modulation range from the "high" through "low" speed range, for example, to a speed range defined by new limits, wherein the new upper limit would be the nominal "low" conveyor speed, and the new lower limit would be an actual zero speed or stoppage of the conveyor section. This is accomplished by the provision of limit shift means coupled to the speed control mechanism, which limit shift means are actuatable in response to the detection of an accumulation of articles at the upstream end of the conveyor section, such detection being achieved through the provision of a further sensing mechanism thereat, again preferably embodying fluidic construction techniques. Accordingly, upon a continued build-up of articles which accumulate and are sensed at the upstream end of the conveyor section, the speed of the conveyor motor drive is still further reduced towards zero, again in a smooth and continuous manner, by shifting the limits of operation of the basic speed control mechanism previously discussed.

Once the accumulation of articles upon the conveyor section begins to clear such as through commencement of operation of a downstream apparatus, for example, the accumulation on the conveyor section first would clear at its downstream end and such clearance would be sensed by the sensing means disposed at the downstream location to effect a smooth modulation of the conveyor speed from "zero" towards the nominal "low" speed above-discussed. Shortly thereafter, the accumulated build-up at the upstream end of the conveyor section would likewise clear, triggering into operation the limit shift mechanism causing the speed of the conveyor to be further modulated from "low" speed towards the nominal running or "high" speed, thus returning the conveyor section back to its initial running conditions.

Considering that the typical conveyor incorporates a plurality of individual motor-driven sections, the operation above-described will be seen as sequential with respect to each of the conveyor sections and fully automatic not requiring the intervention of an operator.

BRIEF DESCRIPTION OF THE DRAWINGS

The invention will become better understood and further features and advantages thereof will become apparent from the following detailed description of a preferred inventive embodiment, such description making reference to the appended sheets of drawings, wherein.

DETAILED DESCRIPTION OF A PREFERRED INVENTIVE EMBODIMENT

Figure 1:
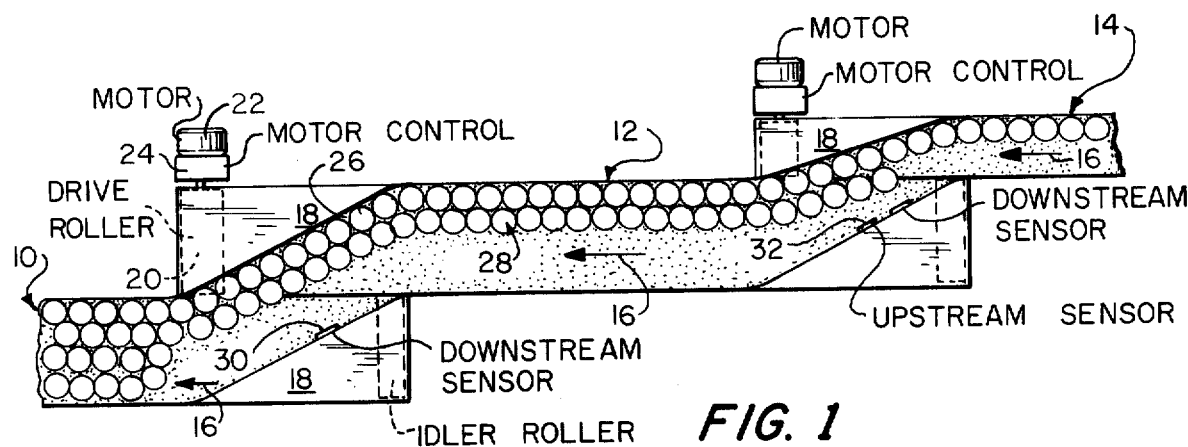
FIGS. 1–3 are top plan views of a section of a multisection conveying apparatus provided with the control mechanism of the instant invention, such illustrations schematically depicting the manner in which articles can accumulate on such conveyor sections thus triggering the control technique of the instant invention.

With reference now to the drawings and particularly to FIG. 1 thereof, a typical conveyor section is disclosed having associated therewith the novel control system of the instant invention. Specifically, the overall conveying apparatus will be seen to be composed of a plurality of individual sections, such as sections 10, 12, and 14, the conveying apparatus providing a direction of conveyance as indicated by arrows 16, for example. Each conveying section, such as section 12, incorporates a belt or chain 18, the feed of which is accomplished by a drive roller 20, for example, coupled to a separate motor drive 22 therefor which motor drive is controlled by a motor control constructed in accordance with the teachings of the instant invention and as will be discussed hereinbelow. In the typical fashion, a "bridge" or deflecting wall 26 is provided as between each conveyor section so that the transport of articles generally designated by reference numeral 28 from one conveyor section 10, 12, and 14, to another conveyor section can readily be accomplished. Thus, with each motor drive 22 for each conveyor section 10, 12, and 14 being operated at the same speed, a smooth and continuous flow of articles 28 on the conveying apparatus will take place in the direction of travel indicated by reference numeral 16.

Figure 2:
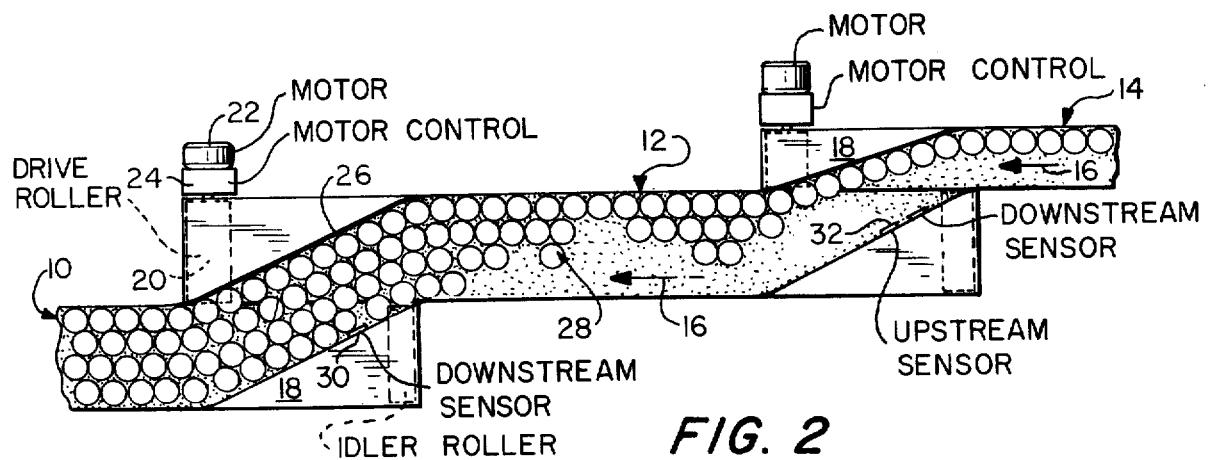

Let it be assumed, for example, that some blockage of downstream equipment has occurred, such as a packaging apparatus or the like. Under such circumstances, articles 28 upon the conveying apparatus would begin to accumulate at the downstream end of the conveyor section 12, for example, as is depicted in FIG. 2 of the application drawings. This condition would be sensed by the downstream sensor associated with motor control 24 of the drive motor 22 of conveyor section 12 which would serve to smoothly decrease the speed of motor 22 from a normal or "high" running speed, towards a nominal "low" speed in a fashion to be described. Accordingly, the rate of feed of articles on conveyor section 12 towards the subsequent sections 10, for example, would be reduced and, if the downstream blockage was not severe, such initial reduction of conveyor speed might serve to clear the undesired accumulation of articles such that the article flow would re-assume the condition depicted in FIG. 1 of the application drawings.

Figure 3:
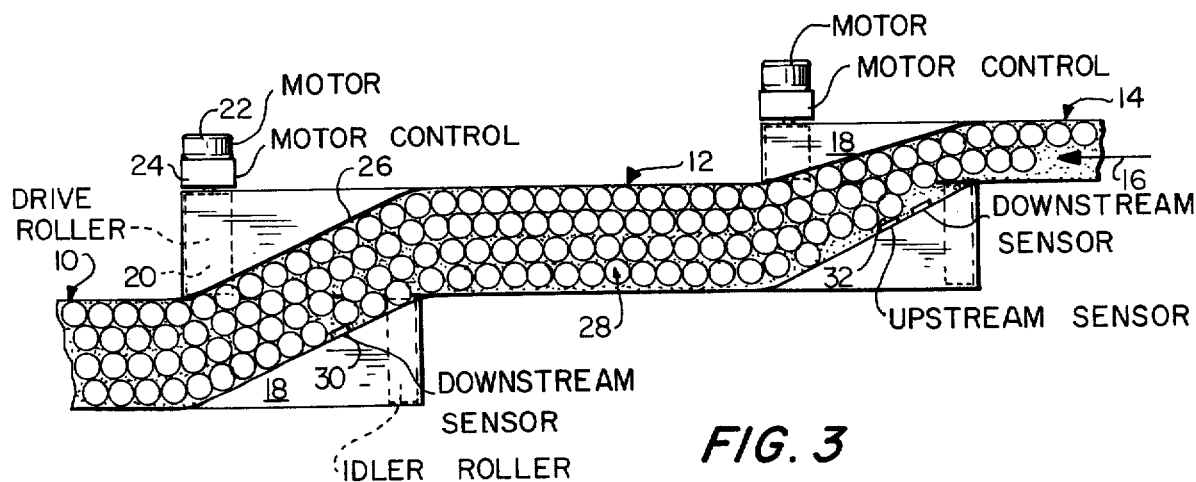

If this initial reduction in conveyor speed was not sufficient to clear the accumulation and the accumulation continued to build, such accumulation of articles 28 would subsequently be sensed by the upstream sensor 32 associated with motor 22 of conveyor section 12. Upstream sensor 32 would operate through the motor control 24 to shift the speed modulation range initially dictated by downstream sensor 30 such that the speed of the conveyor section 12 would be further reduced and modulated within a new range of speeds having as its upper limit the nominal "low" speed condition above-discussed and having as its lower limit a zero speed or complete stoppage of the conveyor section 12. An accumulation of articles 28 upon the conveyor section sufficient to trigger the upstream sensor 32 is as depicted in FIG. 3 of the application drawings. It should further be noted that such an accumulation of articles sensed by the upstream sensor 32 associated with motor control 24 of conveyor section 12 would also serve to trigger the downstream sensor 30 of motor control 24 associated with the next conveyor section 14 thus serving to initially reduce the speed of conveyor section 14, as well, in a sequential fashion.

When the downstream equipment re-starts, i.e., when the blockage is eliminated, the accumulation of articles upon conveyor section 12, for example, would first clear at is downstream end which condition would be detected by downstream sensor 30. When the clearance of the accumulation is so detected, the conveyor motor drive 22 of conveyor section 12 would be caused to modulate upwardly the speed of conveyor section 12 within the reduced speed range from "zero" towards the nominal "low" speed as above-discussed, thus serving to graually feed more articles 28 towards the downstream apparatus. Eventually, the clearance of the accumulation would be sensed by upstream sensor 32 associated with the motor drive 22 of conveyor section 12 and, through the motor control 24, the range of speed modulation would then be shifted upwardly so as to have the normal or "high" running speed as the upper limit, and the nominal "low" speed as the lower limit, thus progressively and continuously feeding more and more articles towards the downstream equipment in a smooth fashion. Eventually, and automatically, a normal condition will again be assumed as is depicted in FIG. 1 of the application drawings.

Importantly, and as should be appreciated, each conveyor section operates in an independent and automatic fashion and thus, as between the plurality of conveyor sections 10, 12, and 14, for example, the gradual slowing down and re-starting of each section will occur in a sequential fashion.

The novel control system of the instant invention, in general functional description, has therefore been seen to comprise a speed control means such as motor control 24 which is operatively connected to a conveyor motor drive 22 and is responsive to the presence of a first control signal such as that generated by downstream sensor 30 for automatically modulating the velocity of the article conveyor within a range of speeds defined by predetermined upper and lower limits. This first control signal is generated by the downstream sensor 30 upon sensing of an accumulation of articles at such location.

The motor control 24 of the inventive control system has been further described as incorporating a limit shift means which is actuatable in response to the presence of a second control signal, such as the signal generated by upstream sensor 32, for automatically adjusting the predetermined upper and lower limits so as to shift the speed modulation range from a range initially defined by a normal running or "high" speed as the upper limit and a nominal "low" speed as the lower limit, to a new range wherein the nominal "low" speed constitutes the adjusted upper limit, and a zero speed or complete stoppage of the conveyor section constitutes the new lower limit. The second sensing means constituted by upstream sensor 32 generates its control signal upon sensing an accumulation of articles at such upstream location.

Figure 4:
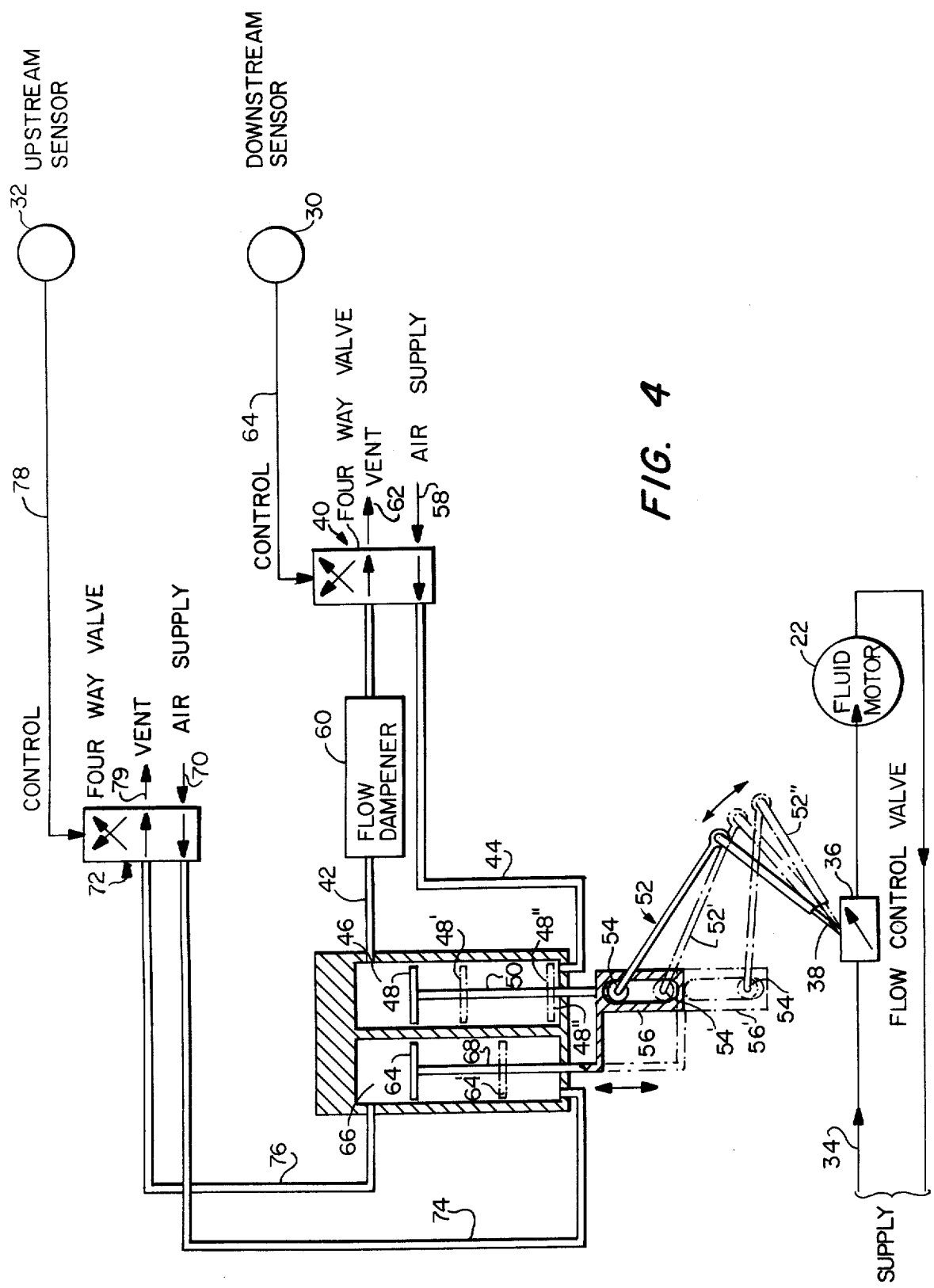
FIG. 4 is a schematic illustration of one embodiment of the control system of the instant invention utilizing hydraulic and fluid operating mechanisms for reliability of operation and simplicity of construction.

For a better understanding of the preferred structure of the instant invention, attention is now directed to FIG. 4 of the application drawings, wherein a simplified-hydraulic and fluidic control apparatus is illustrated. In this illustrative embodiment, it is contemplated that the motor drive 22 for each conveying section is a fluid motor fed by a source of fluid supply such as hydraulic lines 34. The flow of hydraulic fluid in lines 34 and thus the speed of operation of fluid motor 22 is contemplated to be controlled by an adjustable flow control valve 36 of conventional construction, flow control valve 36 having an adjustment arm 38 extending therefrom, the angular position of adjustment arm 38 as illustrated controlling the area of the orifice through flow control valve 36 and thus the volume of hydraulic fluid flow into motor 22. The adjustment of flow control valve 36 extends from a wide-open position as illustrated by the full-line position of adjustment arm 38, towards a full-off position illustrated by a the dotted-line position at the far right-hand end of the arcuate path of travel of adjustment arm 38.

The "speed control means " of the instant invention constitutes a four-way fluid valve means 40 of conventional construction such as Model MJ4-4 available from Clippard Instrument Laboratory, Inc. of Cincinnati, Ohio. The valve includes a Model MPA-7 pilot actuator so as to be controlled by a pilot pressure provided by downstream sensor 30 to route a fluidic air supply to either the upper or lower lines 42 and 44 respectively of a first pneumatic cylinder means 46 (such as Model D12 available from Alkon Products of Wayne, New Jersey) containing a piston 48, the bearing arm 50 of which is coupled through linkage arms 52 to the adjustment arm 38 of flow control valve 36. The point of connection of bearing arm 50 and the linkage arms 52 is designated by reference numeral 54 which defines a pin disposed within a slotted guide 56, the slotted guide 56 defining the upper and lower limits of travel of piston 48 as shown. In the upper position of piston 48 as indicated by the full lines, the pin 54 of the bearing arm 50 would be in its upper limiting position within guide 56, and linkage arm 52 would assume the illustrated full-line position, causing the flow control valve 36 to be in a full-on position. Therefore, fluid motor 22 for the conveyor section in question would be operating at full or "high" speed.

During this normal running condition, the fluid air supply 58 to the four-way valve means 40 would be switched to the conduit 44 leading to the lower side of piston 48, the upper side of piston 48 communicating through conduit 42 and a flow dampener 60 to be described hereinbelow to an ambient vent designated by reference numeral 62. This particular switched condition of four-way valve means 40 and the routing of air pressure therethrough as described is effected by downstream sensor 30 being closed, downstream sensor 30 constituting, for example, a fluidic atmospheric vent having a movable closure associated therewith, which movable closure senses the accumulation of articles upon the conveyor thereat. Downstream sensor 30 is of conventional construction such as Model MPS-2 available from Clippard Instrument Laboratory, Inc.

When an accumulation of articles 28 on conveyor section 12, for example, is sensed by the downstream sensor 30, downstream sensor 30 will be caused to become open, thus exhausting the control line 64 thereof and causing the air supply 58 to be applied to the upper conduit 42 above the piston 48, while the lower conduit 44 will be switched to communicate with the ambient vent 62. This pressure differential created across piston 48 will cause the piston 48 and its associated bearing arm 50 to move downwardly within guide 56 in a direction towards the lower limit defined by the bottom portion of the slot of guide 56. Piston 48 would therefore assume the dotted line position 48', and the connecting pin would assume the dotted line position 54'. Linkage arm 52 would assume the dotted line position 52' which has the effect of translating the downward motion of piston 48 into an arcuate motion of adjustment arm 38 of flow control valve 36 as shown, thus reducing the hydraulic supply along lines 34 feeding the fluid motor 22. Fluid motor 22 would therefore assume a nominal "low" speed.

It should be noted that a flow dampener 60 is preferably provided in conduit 42 leading from the four-way valve means 40, flow dampener 60 being of conventional construction and comprising, for example, an oil-filled reservoir. Flow dampener 60 serves to smooth and delay the response of piston 48 to changes in the pressure differential thereacross and thus better insures that the modification and modulation of speed of fluid motor 22 takes place in a continuous and smoothly controlled fashion. Flow dampener 60, therefore, assists in controlling the rate of acceleration and deceleration of fluid motor 22 in response to a control signal generated by downstream sensor 30.

As is shown, the position of the slotted guide 56 which defines the upper and lower limits of travel of piston 48 is itself controlled by the position of a further piston 64 disposed within a further pneumatic cylinder means 66 similarly constructed as cylinder 46, slotted guide 56 being coupled to the bearing arm 68 of piston 64. When piston 64 is in its full-line position as illustrated, the limits defined by the guide 56 on the travel of piston 48 are such as to bring about a speed modulation range having a normal running or "high" speed as the upper limit, and a nominal "low" speed as the lower limit. Piston 64 is maintained in its illustrated position when a further air supply 70 routed through a further four-way valve means 72 is coupled to the lower portion of the pneumatic cylinder 66 through conduit 74, the upper conduit 76 of pneumatic cylinder 66 being coupled in this position of the four-way valve means 72 to an ambient vent 78. Four-way valve means 72 can be of identical conventional construction as was described with respect to valve means 40, this switched-condition of valve means 72 occurring in the absence of a control signal on control or pilot line 78 leading to upstream sensor 32. Again, upstream sensor 32 is of identical construction as downstream sensor 30 and preferably comprises a fluidic control venting element.

If the previously described reduction and downward modulation of the speed of motor 22 is not adequate to eliminate the blockage of articles 28 upon a conveyor section 12, the articles 28 continue to accumulate into the condition illustrated in FIG. 3 of the application drawings. In such condition, upstream sensor 32 would respond to the accumulation and become opened to vent the control lines 78, causing the four-way valve means 72 to switch and re-route the connection such that the air supply 70 would be applied to the upper conduit 76, whereas the ambient vent 79 would become associated with the lower conduit 74 of the pneumatic cylinder 66. This change in air pressure would cause the piston 64 with pneumatic cylinder 66 to move downwardly to assume the dotted-line position 64' as shown, thus lowering guide 56 into its dotted-line position 56' as illustrated. In effect, then, actuation of four-way valve means 72 by upstream sensor 32 serves to adjust the limits of travel of the main piston 48 and thus shift the range of speed modulation thereof. In this respect, when guide 56 assumes its dotted-line position 56', piston 48 will thereafter tend to assume its lower most position illustrated by the dotted-line designated by reference number 48", pin 54 thereof assuming its lower most position 54", and linkage arm 52 assuming the dotted-line position 52" which is representative of a "zero" speed or an "off" position of the flow control valve 36.

Once the downstream blockage on the control conveyor section is cleared, the accumulation of articles 28 upon the conveyor would first begin to clear at its downstream side, which condition would be sensed by a closing of the downstream sensor 30 and a further actuation of the four-way valve means 40.

This actuation of valve means 40 caused by a closure of downstream sensor 30 would serve to reconnect air supply 58 to the lower conduit 44, while venting the upper conduit 42 to the atmosphere 62 through the flow dampener 60. Accordingly, piston 48 would tend to move upwardly from the position indicated by the dotted-lines 48" towards the position indicated by the dotted-lines 48' and thus smoothly modulate the speed of the conveyor section from a zero speed, towards the nominal "low" speed. As the accumulation of articles upon the conveyor is cleared further, such clearance will then be detected by the upstream sensor 32, which sensor would close and effect a switching of four-way valve means 72, such that the air supply 70 thereto would be applied to the lower conduit 74, whereas upper conduit 76 would be coupled to the atmospheric vent 79. This switching and the pressure differential caused thereby would move piston 64 of pneumatic cylinder 66 back towards its upper or full-line position. In so moving, slotted guide 56 would return to its full-line position thereby allowing piston 48 of pneumatic cylinder 46 to continue its smooth upward travel towards its full-line position and normal running speed of the conveyor section.

As can be appreciated by those skilled in the art, further dampening mechanisms and by-pass valves can be provided in the various conduits leading to the pneumatic cylinders 48 and 66 by which the rate of acceleration, rate of deceleration, and other operating parameters of the system can readily be controlled in an obvious manner. Further, it should be recognized that a single preferred embodiment of the invention has been described in detail hereinabove and that mechanical modifications thereto can readily be effected while still retaining the over-all functional operation. Accordingly, the scope of the invention is to be construed by the appended claims.

What is claimed is:

1. An automatic control system for a motor-driven conveyor section, said system comprising: speed control means operatively connected to the conveyor motor drive and responsive to the presence of a first control signal for automatically modulating the velocity of the article conveyor within a range of speeds defined by predetermined upper and lower limits; limit shift means coupled to said speed control means and actuable in response to the presence of a second control signal for automatically adjusting said predetermined upper and lower limits to shift said speed modulation range; first sensing means disposed in a downstream location with respect to the direction of conveyance for sensing an accumulation of articles thereat and generating said first control signal in response thereto; and second sensing means disposed in an upstream location with respect to the direction of conveyance for sensing an accumulation of articles thereat and generating said second control signal in response thereto.

2. The control system defined in claim 1, wherein said speed control means modulates said conveyor velocity within said range in a direction towards decreasing speeds in the presence of said first control signal, and in a direction towards increasing speeds upon the absence of said first control signal, and wherein said limit shift means during actuation decreases said conveyor speed modulation range.

3. The control system defined in claim 2, wherein said speed range defined by said predetermined upper and lower limits nominally extends from a relatively high to a relatively low speed, respectively, and wherein said shifted speed range nominally extends from said relatively low speed to a zero speed, respectively.

4. The control system defined in claim 2, further including damper means for retarding and smoothing the speed modulation effected by said speed control means.

5. The control system defined in claim 2, wherein said speed control means comprises a first pneumatic cylinder having a piston movable in a guide and connected to a device for controlling the input power to the conveyor motor drive, the position of said guide controlling the limit of travel of said piston and defining said predetermined upper and lower limits of said speed modulation range, said system further including pneumatic valve means for charging said pneumatic cylinder with a fluid supply, said piston normally being biased in one direction towards a limit position defined by said guide, movement of said piston in the opposite direction being effected by said valve means in the presence of said first control signal, said first sensing means and said first control signal being fluidic.

6. The control system defined in claim 5, wherein said limit shift means comprises a further pneumatic cylinder and movable piston coupled to said guide for moving same to effect said shifting of the speed modulation range by adjusting the limits of travel of said piston associated with said first pneumatic cylinder, and wherein further pneumatic valve means are provided for charging said further cylinder with a fluid supply to effect movement of said guide in the presence of said second control signal, said second sensing means and said second control signal being fluidic.

7. The control system defined in claim 6, wherein said conveyor motor drive is a fluid motor and wherein said device for controlling the input power thereto is an adjustable fluid flow control valve disposed in a fluid motor supply line.

8. A method of continuously controlling each section of a multiple section article conveyor to avoid and clear undesired accumulations of articles caused by a downstream blockage, said method comprising the following sequential steps:

1. initially operating the conveyor section at a first running speed;
2. automatically and smoothly decreasing the speed of the conveyor section toward a second lower speed upon sensing an accumulation of articles at a downstream end of the conveyor section thus reducing the rate of article feed;
3. returning the conveyor section to the first running speed from the second lower speed through a smooth speed increase upon clearance of the accumulation of articles at the downstream end of the conveyor section; and then repeating step (2);
4. automatically further decreasing the speed of the conveyor section from the second lower speed toward a zero speed if the accumulation of articles at the downstream end of the conveyor section persists and if an accumulation of articles at an upstream end of the conveyor section is also detected, thus further reducing the rate of article feed;
5. returning the conveyor section to the second lower speed through a smooth speed increase upon clearance of the accumulation of articles at the upstream end of the conveyor section, and thereafter repeating step (3).

* * * * *